(12) United States Patent
Uchiyama et al.

(10) Patent No.: US 10,300,950 B2
(45) Date of Patent: May 28, 2019

(54) SUSPENSION MEMBER AND METHOD FOR MANUFACTURING SAME (71) Applicant: Yorozu Corporation, Yokohama (JP)

(72) Inventors: Yuji Uchiyama, Yokohama (JP); Shouta Tabata, Yokohama (JP)

(73) Assignee: Yorozu Corp., Yokohama (JP)

( * ) Notice: Subject to any disclaimer, the term of this patent is extended or adjusted under 35 U.S.C. 154(b) by 309 days.

(21) Appl. No.: 15/129,868

(22) PCT Filed: Mar. 31, 2014

(86) PCT No.: PCT/JP2014/059585
§ 371 (c)(1),
(2) Date: Apr. 5, 2017

(87) PCT Pub. No.: WO2015/151211
PCT Pub. Date: Oct. 8, 2015

(65) Prior Publication Data
US 2017/0225712 A1    Aug. 10, 2017

(51) Int. Cl.
*B62D 21/11*    (2006.01)
*B62D 65/12*    (2006.01)

(52) U.S. Cl.
CPC .............. *B62D 21/11* (2013.01); *B62D 65/12* (2013.01)

(58) Field of Classification Search
CPC ................................ B62D 65/12; B62D 21/11
See application file for complete search history.

(56) References Cited

U.S. PATENT DOCUMENTS 4,660,345 A * 4/1987 Browning .............. B62D 21/08
164/63
5,364,128 A * 11/1994 Ide .......................... B60G 7/02
280/781

(Continued)

FOREIGN PATENT DOCUMENTS

EP    2888152 B1 *  8/2017
EP    3118086 B1 * 12/2017

(Continued)

OTHER PUBLICATIONS

International Search Report (English translation) for PCT/JP2014/059585 dated Aug. 12, 2014.

(Continued)

*Primary Examiner* — Nicole T Verley
(74) *Attorney, Agent, or Firm* — Drinker Biddle & Reath LLP (57) ABSTRACT

A suspension member and a method for manufacturing the same are provided by which it is possible to manufacture the suspension member at a low cost without decreasing rigidity thereof while also suppressing strain at joining portions.
The present invention is a method for manufacturing a suspension member (100) provided with: a pair of side members (40), and a cross member (10) linking the pair of side members and including an upper member (11) and a lower member (21) extending in a lateral direction of a vehicle and provided with base portions (12 and 22) and raised portions (15, 16, 25, and 26). The method includes: an assembly step (ST1) in which the cross member is formed by the upper member and the lower member and is assembled into a state where the side members are inserted from the outside into an internal space (S) formed therein by the upper member and the lower member; a first joining (ST2) in which the upper member and the lower member are joined together; and a second joining step (ST3 and ST4) in which (Continued)

the side members and the cross member overlapping each other in the internal space are joined together.

15 Claims, 11 Drawing Sheets

(56) References Cited

U.S. PATENT DOCUMENTS

| | | | | |
|---|---|---|---|---|
| 5,603,581 A * | 2/1997 | Fujita | ................... | B21C 23/14 |
| | | | | 403/272 |
| 5,692,798 A * | 12/1997 | Wehner | ................... | B62D 21/11 |
| | | | | 296/203.01 |
| 5,862,877 A * | 1/1999 | Horton | ................... | B60G 7/02 |
| | | | | 180/312 |
| 5,882,039 A * | 3/1999 | Beckman | ................... | B62D 21/11 |
| | | | | 180/311 |
| 6,408,515 B1 * | 6/2002 | Durand | ................... | B62D 21/11 |
| | | | | 180/312 |
| 6,739,624 B2 * | 5/2004 | Barber | ................... | B62D 21/11 |
| | | | | 280/124.109 |
| 7,380,876 B1 * | 6/2008 | Barthelemy | ............ | B62D 25/00 |
| | | | | 29/897.2 |
| 7,520,514 B2 * | 4/2009 | Ogawa | ................... | B60G 3/20 |
| | | | | 180/312 |
| 8,511,696 B2 * | 8/2013 | Tanaka | ................... | B60G 7/02 |
| | | | | 280/124.109 |
| 8,641,066 B2 * | 2/2014 | Kudla | ................... | B62D 21/11 |
| | | | | 180/312 |
| 8,720,919 B2 * | 5/2014 | Takahashi | ............ | B62D 21/11 |
| | | | | 280/124.109 |
| 9,067,621 B2 * | 6/2015 | Ohhama | ................ | B62D 21/11 |
| 9,139,229 B2 * | 9/2015 | Mikami | ................ | B62D 21/11 |
| 9,440,823 B2 * | 9/2016 | Johnston | .............. | B62D 21/02 |
| 9,616,933 B2 * | 4/2017 | Tanaka | ................ | B62D 21/155 |
| 9,623,909 B1 * | 4/2017 | Hirano | ................ | B62D 21/11 |
| 9,682,727 B2 * | 6/2017 | Tanaka | ................ | B62D 21/11 |
| 9,751,570 B2 * | 9/2017 | Kim | ................ | B62D 25/082 |
| 9,776,662 B2 * | 10/2017 | Hirano | ................ | B60K 5/12 |
| 9,783,234 B2 * | 10/2017 | Tanaka | ................ | B62D 21/11 |
| 9,889,886 B2 * | 2/2018 | Murata | ................ | B62D 21/11 |
| 9,969,440 B2 * | 5/2018 | Kurokawa | ............ | B62D 21/02 |
| 10,059,377 B2 * | 8/2018 | Shimizu | ................ | B62D 25/04 |
| 2005/0248114 A1 * | 11/2005 | Winkler | ................ | B62D 21/11 |
| | | | | 280/124.109 |
| 2006/0219462 A1 * | 10/2006 | Martin | .................. | B62D 21/02 |
| | | | | 180/292 |
| 2007/0200391 A1 * | 8/2007 | Thoms | ................ | B21D 26/033 |
| | | | | 296/187.08 |
| 2016/0075381 A1 * | 3/2016 | Keller | .................. | B62D 21/11 |
| | | | | 280/795 |
| 2016/0375938 A1 * | 12/2016 | Matsuo | ................ | B62D 21/11 |
| | | | | 296/204 |

FOREIGN PATENT DOCUMENTS

| | | | | |
|---|---|---|---|---|
| EP | 2881307 B1 * | 4/2018 | | |
| JP | 2000344130 A | 12/2000 | | |
| JP | 2002154454 A | 5/2002 | | |
| JP | 2003175858 A | 6/2003 | | |
| JP | 2004359190 A | 12/2004 | | |
| JP | 2005297800 A | 10/2005 | | |
| JP | 2010069964 A | 4/2010 | | |
| JP | 2013049376 A * | 3/2013 | ............ | B62D 25/04 |
| WO | WO-2018065510 A1 * | 4/2018 | ............ | B62D 21/11 |
| WO | WO-2018104119 A1 * | 6/2018 | ............ | B62D 21/11 |
| WO | WO-2018104120 A1 * | 6/2018 | ............ | B60G 7/02 |

OTHER PUBLICATIONS

International Search Report (in Japanese) with Written Opinion of International Searching Authority for PCT/JP2014/059585 dated Aug. 12, 2014.
International Preliminary Report on Patentability dated Oct. 13, 2016, with English translation.

* cited by examiner

SUSPENSION MEMBER AND METHOD FOR MANUFACTURING SAME

CROSS-REFERENCE TO RELATED APPLICATIONS

This application is a national stage application (under 35 U.S.C. § 371) of PCT/JP2014/059585, filed Mar. 31, 2014, which is incorporated herein by reference in its entirety.

TECHNICAL FIELD

The present invention relates to a suspension member used as a suspension of an automobile and to a method for manufacturing the same.

BACKGROUND ART

A suspension of an automobile that connects a car body with a wheel is broadly classified into a front wheel side suspension and a rear wheel side suspension. As the rear wheel side suspension, for example, a torsion beam type suspension is used, and as the front wheel side suspension, a suspension formed, by pressing, into a shape of an alphabet I in a plan view is used (see Patent Literature 1).

CITATION LIST

Patent Literatures

Patent Literature 1: JP 2010-69964 A

SUMMARY OF INVENTION

Technical Problem

Currently, a market for a Japanese automobile-related company is not only limited to Japan but is also extended naturally to the Americas, Asia, and the like. Under such circumstances, a specification of a car is customized according to each country. In countries such as in Asia, for example, due to a fact that an automobile is already sold at a low price, there is a demand for an automobile in a low price range, and naturally, a suspension needs to be in a low price range as well.

However, in order to lower a price of the suspension by simply, reducing plate thickness and the like of a component may result in decreased rigidity. In addition, there is a problem in that due to the reduced plate thickness, strain may be easily caused to a welded part of the suspension, which may affect precision of a finished product.

Accordingly, the present invention has been devised to solve the above-described problem, and an objective thereof is to provide a suspension member and a method for manufacturing the same with which it is possible to manufacture the suspension member at a low cost without decreasing rigidity thereof while also suppressing strain at joining portions.

Solution to Problem

The present invention for achieving the above-described objective is a method for manufacturing a suspension member provided with a pair of side members and a cross member. The side members extend in a longitudinal direction of a vehicle and are disposed on right and left sides when mounted on the vehicle. The cross member links the pair of side members together and includes a first member and a second member, each provided with a crossing portion extending in a direction crossing a direction in which the side members extend, and a raised portion raised from the crossing portion. The method includes an assembly step, a first joining step, and a second joining step. In the assembly step, the cross member is formed by the first member and the second member and is assembled into a state where the side members are inserted from the outside into an internal space formed by the first member and the second member. In the first joining step, the first member and the second member are joined together, and in the second joining step, the side members and the cross member overlapping each other in the above-described internal space are joined together.

An embodiment of the present invention for achieving the above-described objective is a suspension member including a pair of side members and a cross member. The side members extend in a longitudinal direction of a vehicle and are disposed on right and left sides when mounted on the vehicle. The cross member links the pair of side members together and includes a first member and a second member, each extending in a lateral direction of the vehicle and provided with a bent part. The first member and the second member include: crossing portions extending in a direction crossing a direction in which the side members extend; raised portions raised relative to the crossing portions; an internal space surrounded by the first member and the second member; insertion portions through which the side members are inserted from the outside into the internal space and are disposed thereto; and joining portions where the side members and the cross member overlapping each other in the internal space are joined together.

According to the method for manufacturing the suspension of the present invention, in the assembly step, the side members are inserted from the outside into the internal space formed from the first member and the second member, in the first joining step, the first member and the second member are joined together, and in the second joining step, the side members and the cross member overlapping each other in the internal space are joined together. Thus, even though the internal space is formed by the first member and the second member within the cross member, by an easy method of inserting the side members into the internal space of the cross member and welding the side members thereto, it is possible to suppress rigidity of the cross member from being decreased while also suppressing strain from being caused by the welding. Since a structure in which the side members are inserted into the internal space formed within the cross member is a very simple structure, it is not necessary to press the first member and the second member, which constitute the cross member, into a complicated shape to achieve the suspension member having high rigidity, whereby it is possible to achieve a cost reduction. According to the suspension member of the present invention, it is configured such that the first member and the second member include the insertion portions through which the side members are inserted, and the joining portions where the side members and the cross member overlapping each other are joined together. Thus, similarly, even though the internal space is formed within the cross member, it is possible to insert the side members into the internal space of the cross member and join the side members thereto, whereby it is possible to suppress the rigidity of the cross member from being decreased while also suppressing the strain from being caused by the welding. Since a structure in which the side members are inserted into the internal space formed by the first member and the second member is very simple, it is not necessary to press the first member and the second member, which constitute the cross member, into a complicated shape to achieve the suspension member having high rigidity, whereby it is possible to achieve a cost reduction.

DESCRIPTION OF EMBODIMENTS

Hereinafter, an embodiment of the present invention is described with reference to the attached drawings. Note that descriptions below are not intended to limit a technical scope or meanings of terms described in claims. Furthermore, a dimension ratio in the drawings is exaggerated for a convenience of description, whereby it may be different from an actual ratio.

Figure 1:
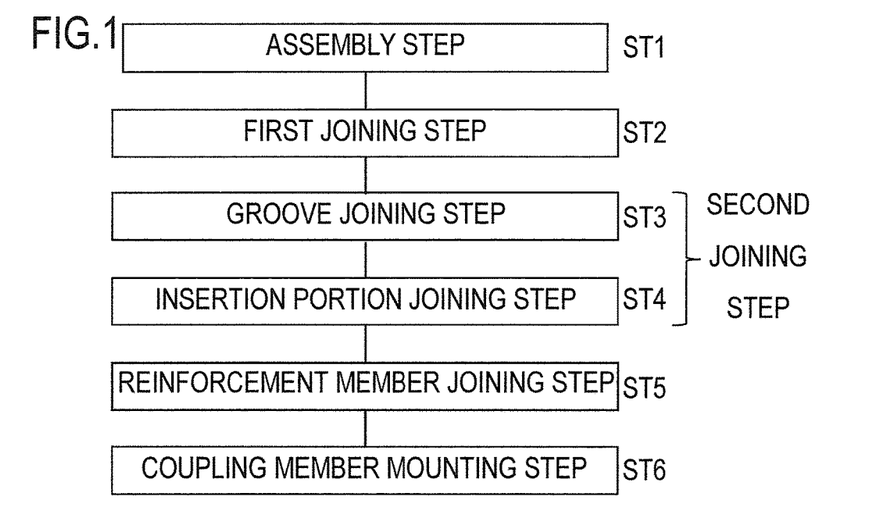
FIG. 1 is a flowchart illustrating a method for manufacturing a suspension member according to one embodiment of the present invention.
Figure 2:
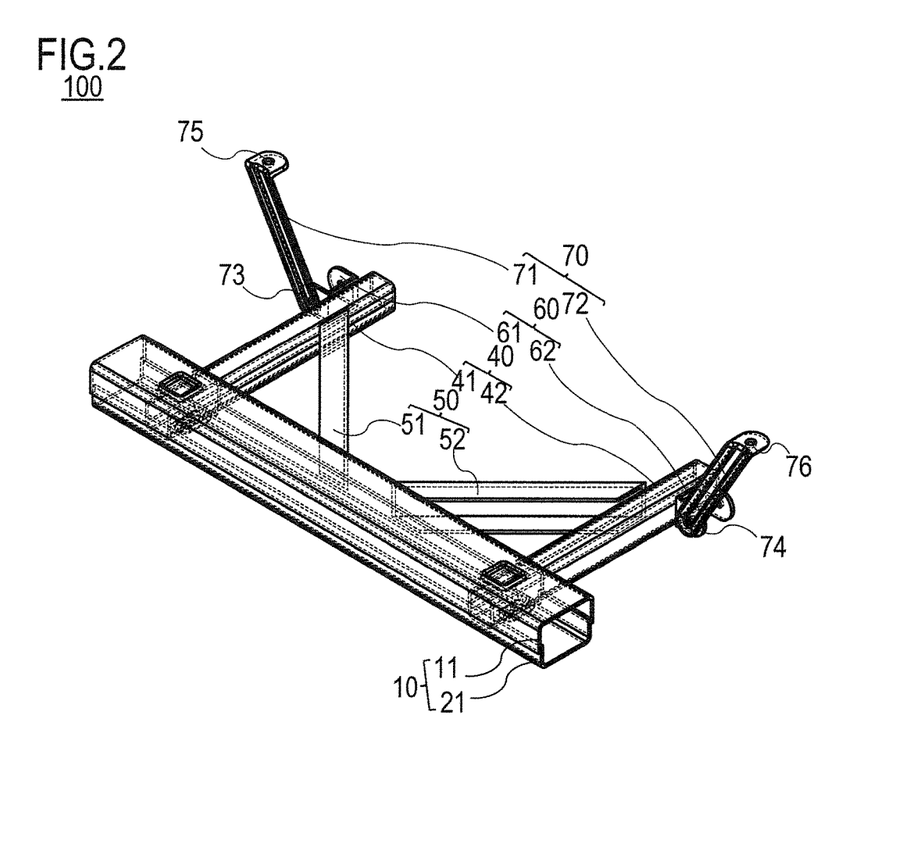
FIG. 2 is a schematic perspective view illustrating the suspension member.
Figure 3:
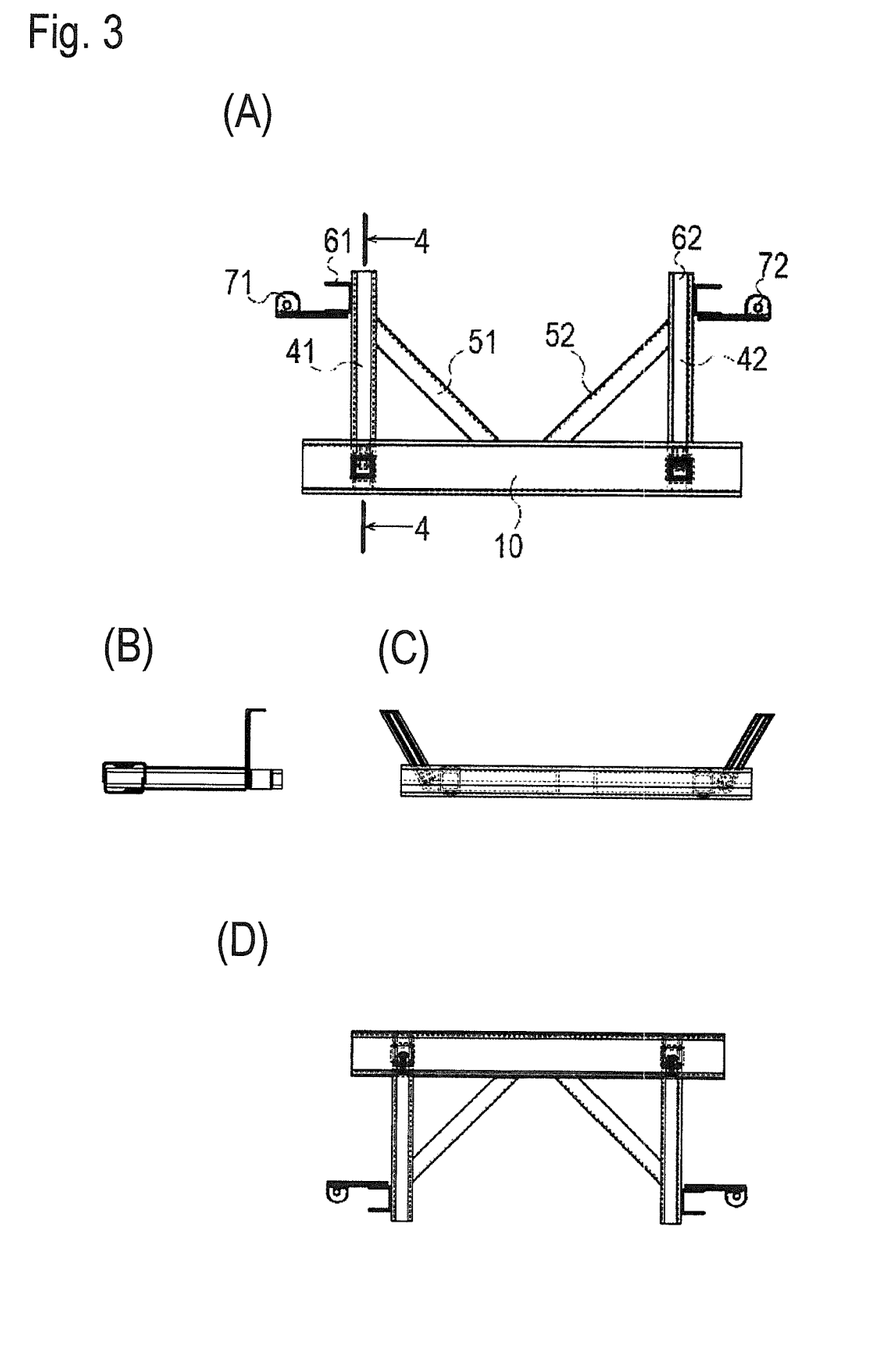
FIGS. 3A to 3D are a plan view, a side view, a front view, and a bottom view illustrating the suspension member.
Figure 4:
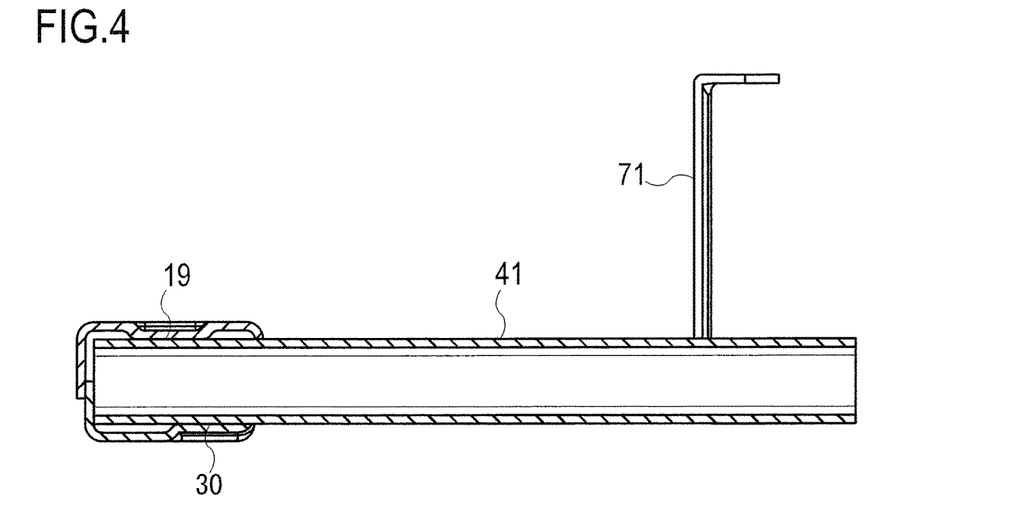
FIG. 4 is a sectional view cut through line 4-4 of FIG. 3A.

FIG. 1 is a flowchart illustrating a method for manufacturing a suspension member according to one embodiment of the present invention. FIG. 2 is a schematic perspective view illustrating the suspension member. FIGS. 3A to 3D are a plan view, a side view, a front view, and a bottom view illustrating the suspension member. FIG. 4 is a sectional view cut through line 4-4 of FIG. 3A.

Figure 5:
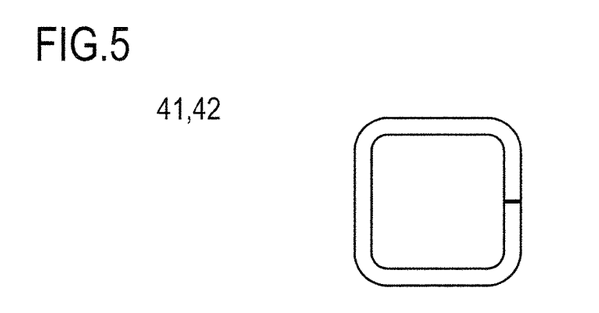
FIG. 5 is a front view illustrating a side member.
Figure 6:
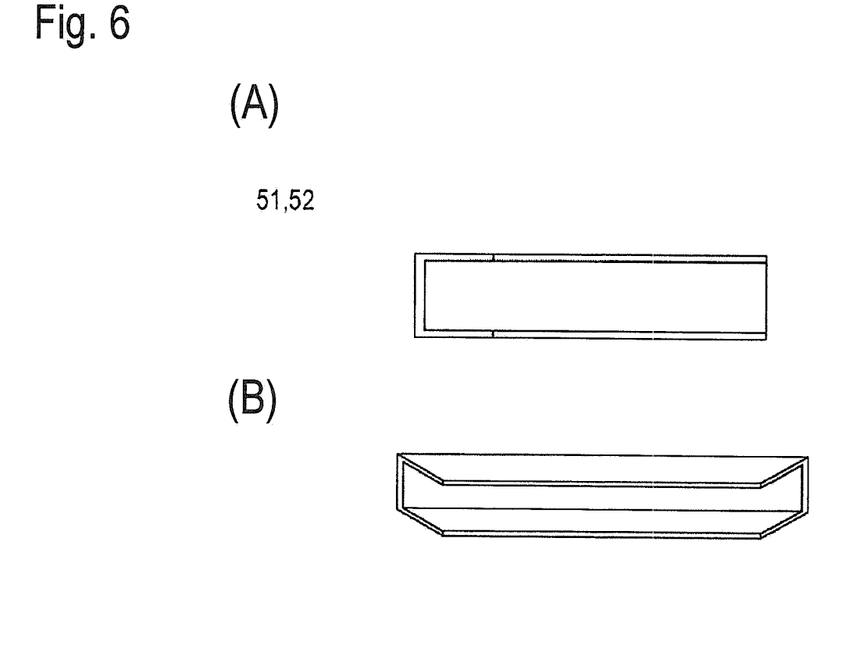
FIGS. 6A and 6B are a front view and a perspective view illustrating a reinforcement member.
Figure 7:
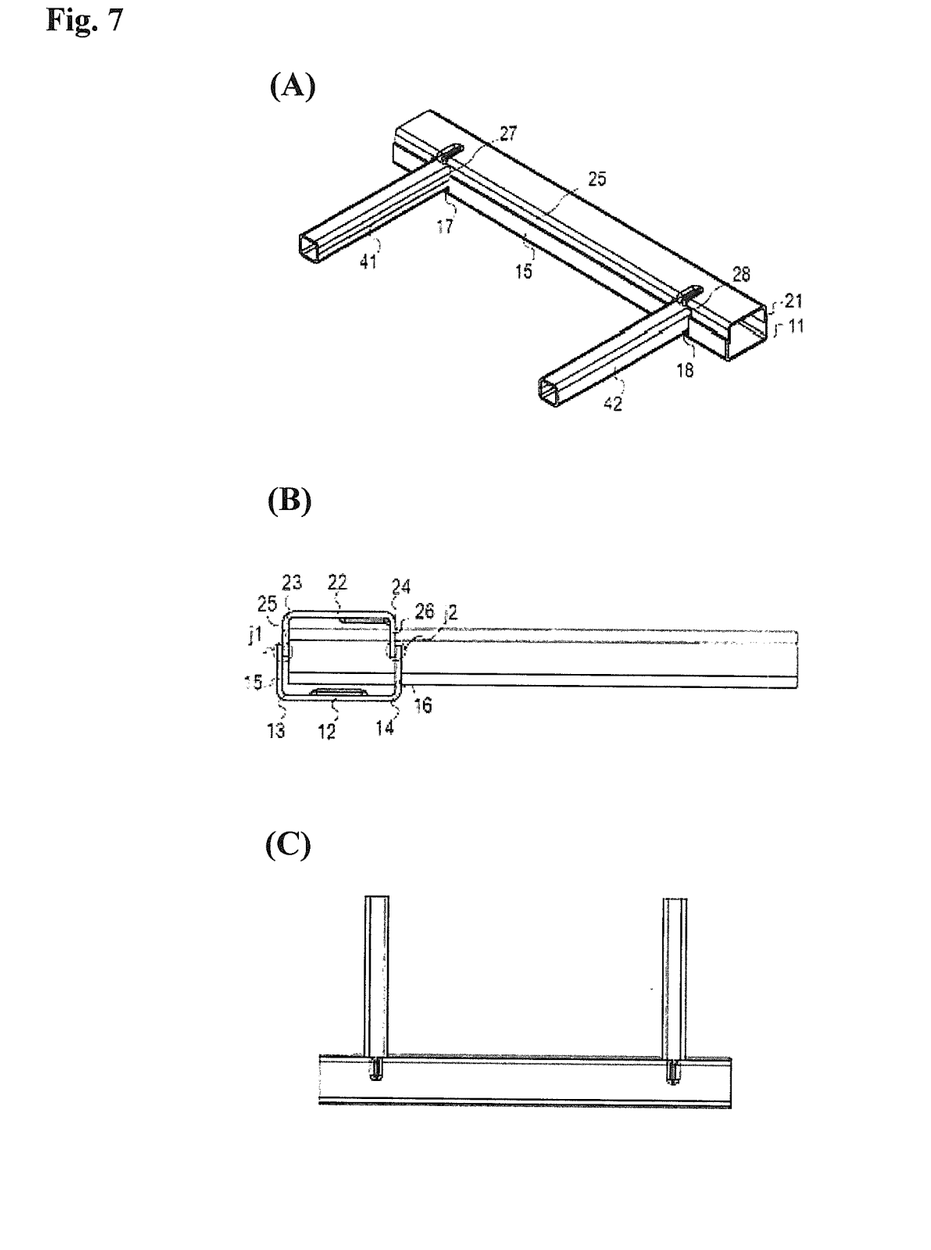
FIGS. 7A to 7C are a perspective view, a side view, and a plan view illustrating an assembly step.
Figure 8:
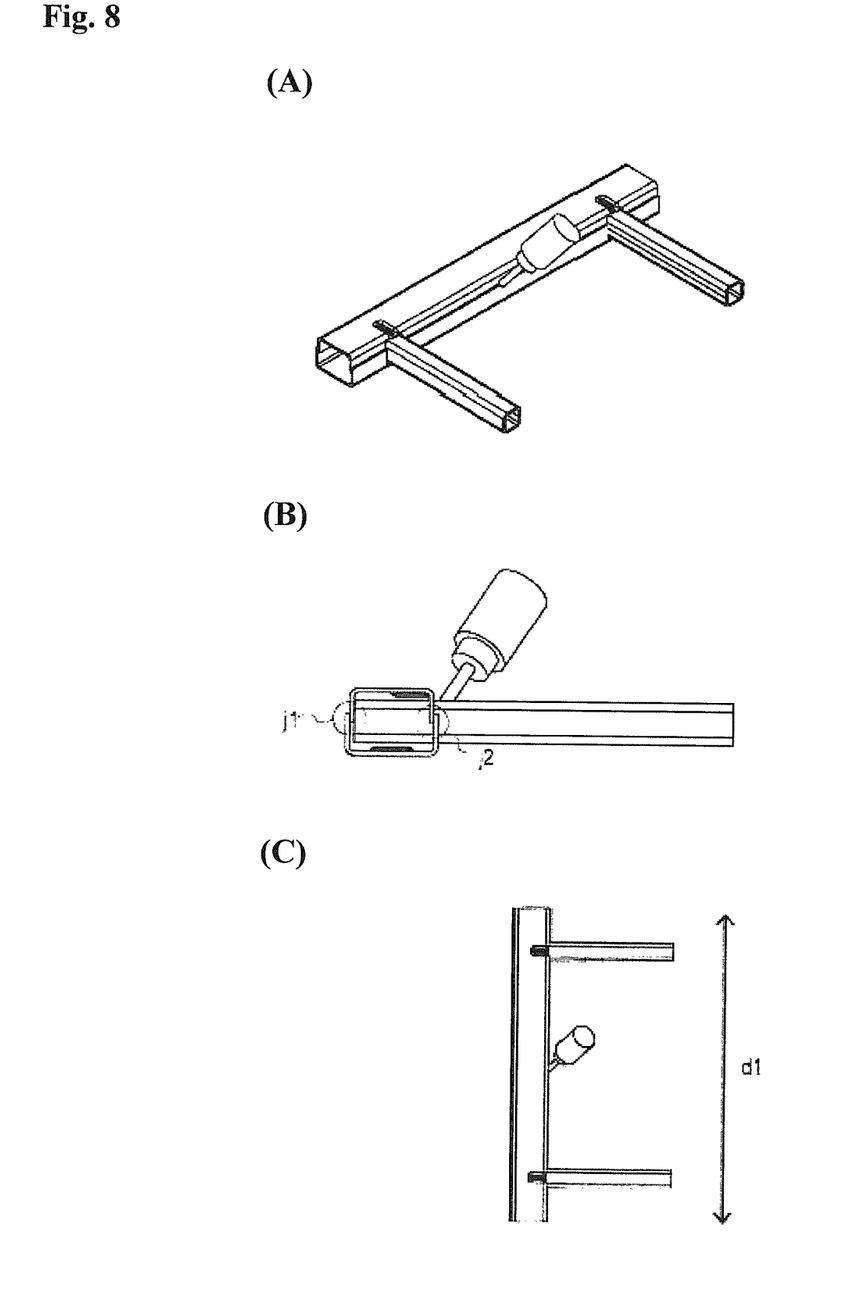
FIGS. 8A to 8C are a perspective view, a side view, and a plan view illustrating a first joining step.
Figure 12:
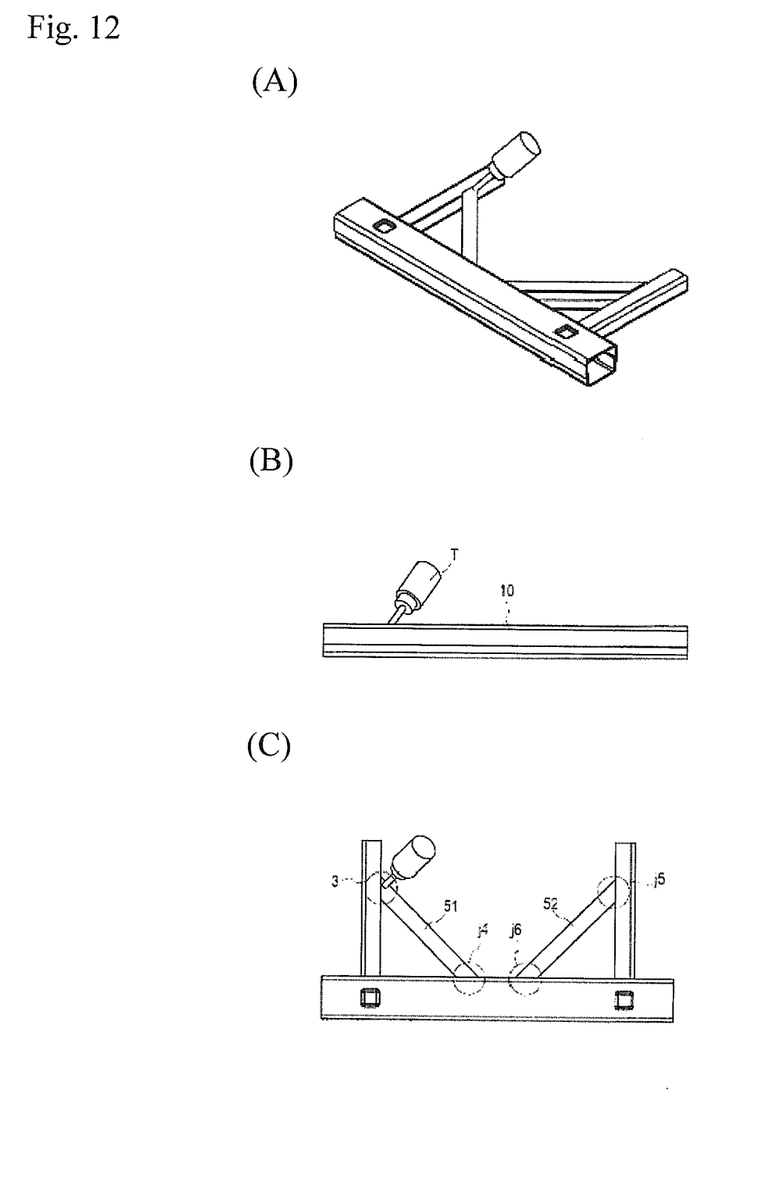
FIGS. 12A to 12C are a perspective view, a front view, and a plan view illustrating a reinforcement member joining step.
Figure 13:
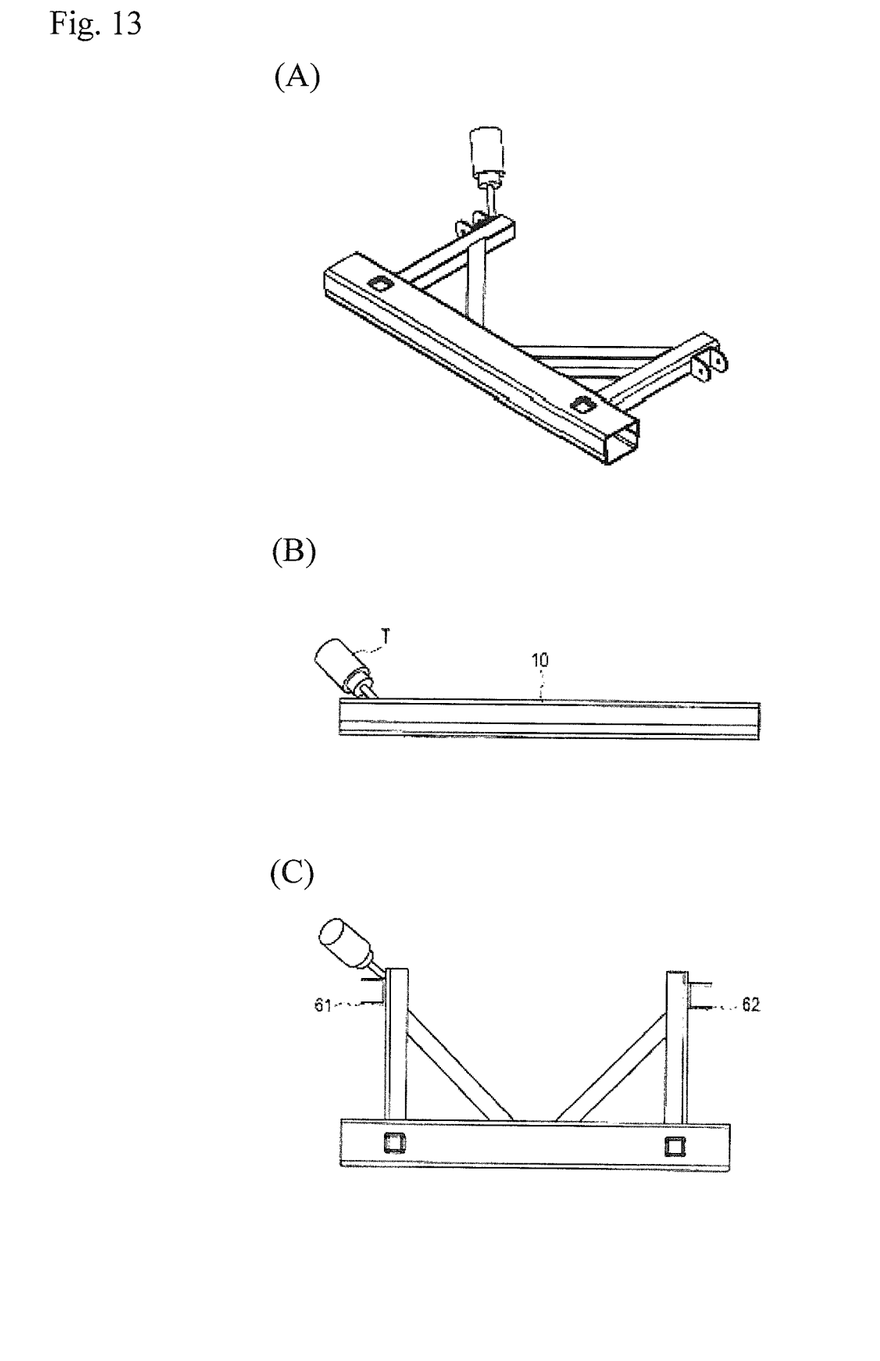
FIGS. 13A to 13C are a perspective view, a front view, and a plan view illustrating a coupling member mounting step.

FIG. 5 is a front view illustrating a side member. FIGS. 6A and 6B are a front view and a perspective view illustrating a reinforcement member. FIGS. 7A to 7C are a perspective view, aside view, and a plan view illustrating an assembly step. FIGS. 8A to 8C area perspective view, aside view, and a plan view illustrating a first joining step. FIGS. 9A to 9C and FIGS. 10A to 10C are perspective views, side views, and plan views illustrating a groove joining step. FIGS. 11A to 11C are a perspective view, a front view, and a plan view illustrating an insertion portion joining step. FIGS. 12A to 12C are a perspective view, a front view, and a plan view illustrating an auxiliary member joining step. FIGS. 13A to 13C are a perspective view, a front view, and a plan view illustrating a coupling member mounting step.

A suspension member 100 according to this embodiment suspends a front wheel of a vehicle with a car body in a front engine front drive (FF) automobile. As illustrated in FIG. 1, a method for manufacturing a suspension member 100 generally includes an assembly step (step ST1), a first joining step (step ST2), a second joining step (a groove joining step (step ST3) and an insertion portion joining step (step ST4)), an auxiliary member joining step (step ST5), and a coupling member mounting step (step ST6).

First, the suspension member manufactured by the method according to the embodiment of the present invention is described. The suspension member 100 includes a cross member 10, side members 40, reinforcement members 50, and coupling members 60 and 70.

As illustrated in FIG. 7B, the cross member 10 includes an upper member 11 (equivalent to a first member) and a lower member 21 (equivalent to a second member). The upper member 11 includes a base portion 12 (equivalent to a crossing portion), bent parts 13 and 14, raised portions 15 and 16, insertion portions 17 and 18, and groove portions 19 and 20. The lower member 21 includes a base portion 22, bent parts 23 and 24, raised portions 25 and 26, insertion portions 27 and 28, and groove portions 29 and 30. Furthermore, an internal space S is formed by the upper member 11 and the lower member 21.

Each of the upper member 11 and the lower member 21 is formed by bending a flat plate-shape member. By bending, the base portions 12 and 22 and the raised portions 15, 16, 25, and 26 are formed. The bent parts 13 and 14 are regions where the base portion 12 changes into the raised portions 15 and 16. In the same way, the bent parts 23 and 24 are regions where the base portion 22 changes into the raised portions 25 and 26. In this embodiment, the raised portions 15 and 25 are disposed on a rear side of a vehicle, and the raised portions 16 and 26 are disposed on a front side thereof when mounted on the vehicle. The base portions 12 and 22 extend in a vehicle lateral direction crossing a direction in which the side members 40 extend. The raised portions 15, 16, 25, and 26 are shapes raised from the base portions 12 and 22.

The insertion portions 17 and 18 are openings formed in the raised portion 15, and the insertion portions 27 and 28 are openings formed in the raised portion 25. Into the insertion portions 17, 18, 27, and 28, the side members 40 are inserted. Shapes of the insertion portions 17, 18, 27, and 28 are formed according to sectional shapes of the side members 40. In this embodiment, each of the side members 40 is formed to have a section that is a hollow rectangular shape; however, the shape is not limited to this. Among edge portions of the rectangular openings formed by the insertion portions 17, 18, 27, and 28, the edge portions linearly extending in the vehicle lateral direction are denoted by 17a, 17b, 18a, and 18b, and the edge portions linearly extending in a vehicle vertical direction are denoted by 17c, 17d, 18c, and 18d (see FIG. 11B).

Figure 10:
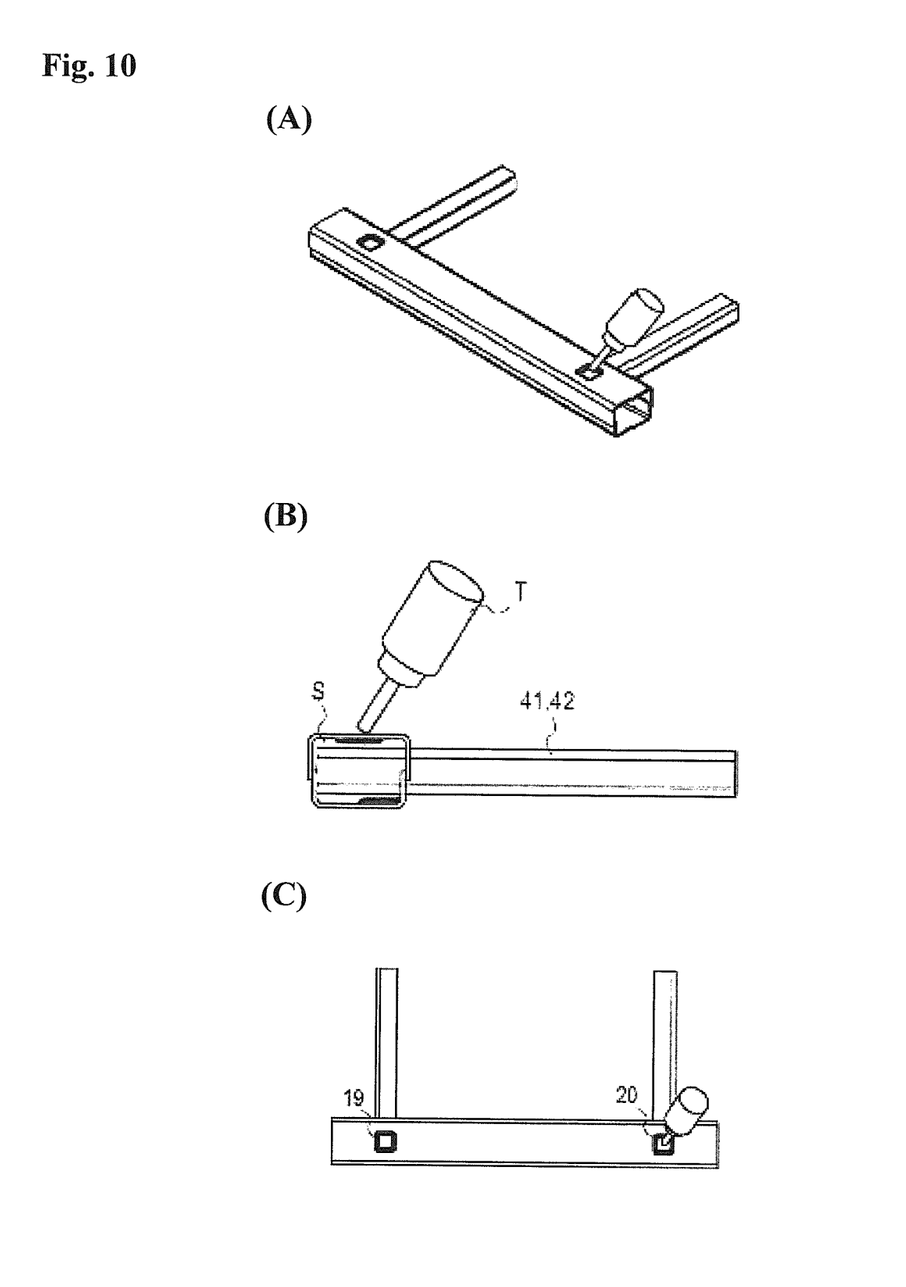
FIGS. 10A to 10C are a perspective view, a side view, and a plan view illustrating the groove joining step.
Figure 11:
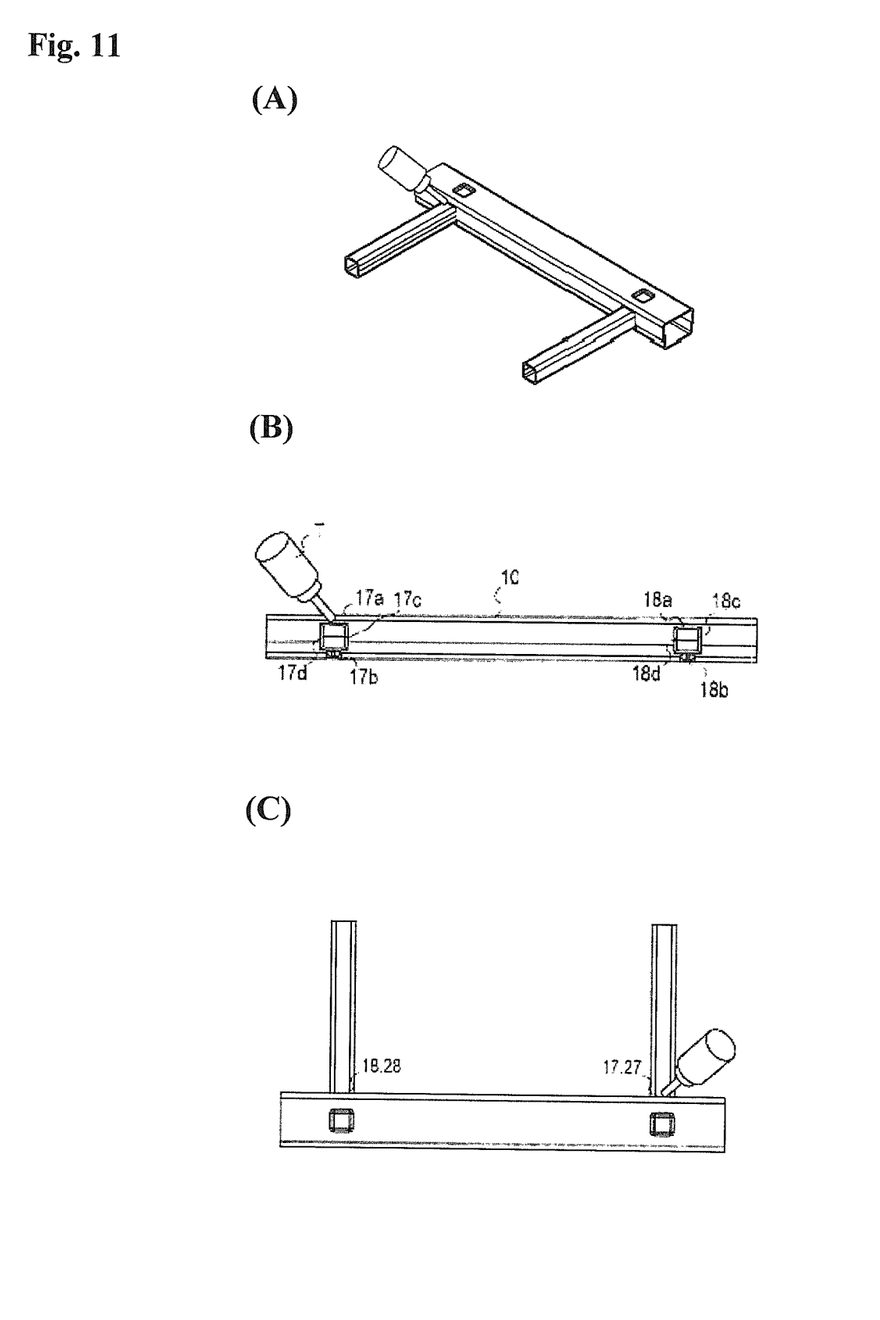
FIGS. 11A to 11C are a perspective view, a front view, and a plan view illustrating an insertion portion joining step.

As illustrated in FIGS. 10C and 11C, the groove portions 19, 20, 29, and 30 are shapes for joining the cross member 10 and the side member 40 together. The groove portions 19 and 20 are substantially rectangular recesses formed in the base portion of the upper member 11. The groove portions 29 and 30 (equivalent to extending grooves) are recesses formed in an extended manner from the base portion 22 toward the bent part 23 of the lower member 21 in a longitudinal direction when mounted on a vehicle. The groove portions 19, 20, 29, and 30 are overlapped and joined with the side member 40 and become joining portions.

Each of the upper member 11 and the lower member 21 is formed to have a U-shaped section. By contacting the upper member 11 on the lower member 21 by facing an opening of a U shape of the upper member 11 with an opening of a U shape of the lower member 21, the internal space S is formed within the upper member 11 and the lower member 21. In the raised portions 15, 16, 25, and 26, there are formed the insertion portions 17, 18, 27, and 28 through which the side members 40 are inserted into the internal space S. In other words, in a state of the suspension member, through the insertion portions 17, 18, 27, and 28, the side members 40 protrude to the outside of the cross member 10 from the hollow space S.

The side member 40 includes side members 41 and 42. The side member 41 is disposed on a left side and the side member 42 is disposed on a right side when mounted on a vehicle. Each of the side members 41 and 42 is formed by bending one sheet of plate material several times. As illustrated in FIG. 5, each of the side members 41 and 42 is formed to have a section that is a hollow rectangular shape; however, the shape is not limited to this.

Reinforcement members 51 and 52 include a reinforcement member 51 and a reinforcement member 52. The reinforcement member 51 is disposed on the left side when mounted on a vehicle and is joined with the side member 41 and the cross member 10. The reinforcement member 52 is disposed on the right side when mounted on a vehicle and is joined with the side member 42 and the cross member 10. As illustrated in FIGS. 6A and 6B, each of the reinforcement members 51 and 52 is formed to have a section that is a U shape; however, the shape is not limited to this, and the section may also be a closed hollow shape.

The coupling members include a bracket 60. The bracket 60 includes a bracket 61 and a bracket 62. Combined with a bracket 70, the brackets 61 and 62 rotatably fasten, with a bolt, a suspension link that performs connection with a tire component. The bracket 61 is disposed on the left side when mounted on the vehicle and is joined with the side member 41. The bracket 62 is disposed on the right side when mounted on the vehicle and is joined with the side member 42. The brackets 61 and 62 are formed to have a section that is a U shape and is provided with a part where the suspension link is mounted. To the suspension link, a bolt insertion part is provided. By inserting a bolt through this part and by fastening with a nut, the suspension link and the bracket 70 are rotatably fastened.

The coupling members also include the bracket 70. The bracket 70 includes a bracket 71 and a bracket 72. The brackets 71 and 72 are components to be connected to a side rail of the car body. The brackets 71 and 72 include link mounting portions 73 and 74 and car body mounting portions 75 and 76. As described above, the link mounting portions 73 and 74 are holes used for being fastened, with a bolt, to the bracket 60, which performs fastening to the suspension link, which is a coupling component with a tire. The car body mounting portions 75 and 76 are holes used for being fastened, with a bolt and the like, to the side rail on a car body side. The bracket 71 is disposed on the left side when mounted on the vehicle and is fastened, with a bolt, to the bracket 61. The bracket 72 is disposed on the right side when mounted on the vehicle and is fastened, with a bolt, to the bracket 62. In FIG. 2, a state is illustrated in which the brackets 71 and 72 are mounted on the brackets 61 and 62. In this embodiment, however, the brackets 71 and 72 are shipped in a state of not being fastened, with a bolt, to the brackets 61 and 62. However, the state in which the brackets 71 and 72 are mounted on the brackets 61 and 62 is not limited to this.

Next, a method for manufacturing a suspension member according to this embodiment is described. As described above, the method for manufacturing a suspension member according to this embodiment includes the assembly step (step ST1), the first joining step (step ST2), the second joining step (step ST3 and step ST4), the reinforcement member joining step (step ST5), and the coupling member mounting step (step ST6). The second joining step includes the groove joining step (step ST3) and the insertion portion joining step (step ST4).

In the assembly step, as illustrated in FIGS. 7A to 7C, the upper member 11 is placed such that the raised portions 15 and 16 thereof face upward, and the lower member 21 is placed thereon so as to be assembled into a state of the cross member 10 having the internal space S (step ST1). Then, the side member 41 is inserted through the insertion portions 17 and 27, and the side member 42 is inserted though the insertion portions 18 and 28. Note that the side members 41 and 42 may also be inserted into the upper member 11 before assembling the lower member 21 into the upper member 11.

In the first joining step, as illustrated in FIGS. 8A to 8C, in the same way as in the assembly step, in a state where the upper member 11 is placed underneath and the lower member 21 is mounted thereon, a welding torch T is approached near contact portions between the raised portions 15 and 16 and the raised portions 25 and 26 to perform welding. As illustrated in FIG. 8C, the welding is performed on the contact portions j1 and j2 between the raised portions 15 and 16 and the raised portions 25 and 26 entirely or partially along a direction d1 in which the cross member 10 extends (step ST2).

Figure 9:
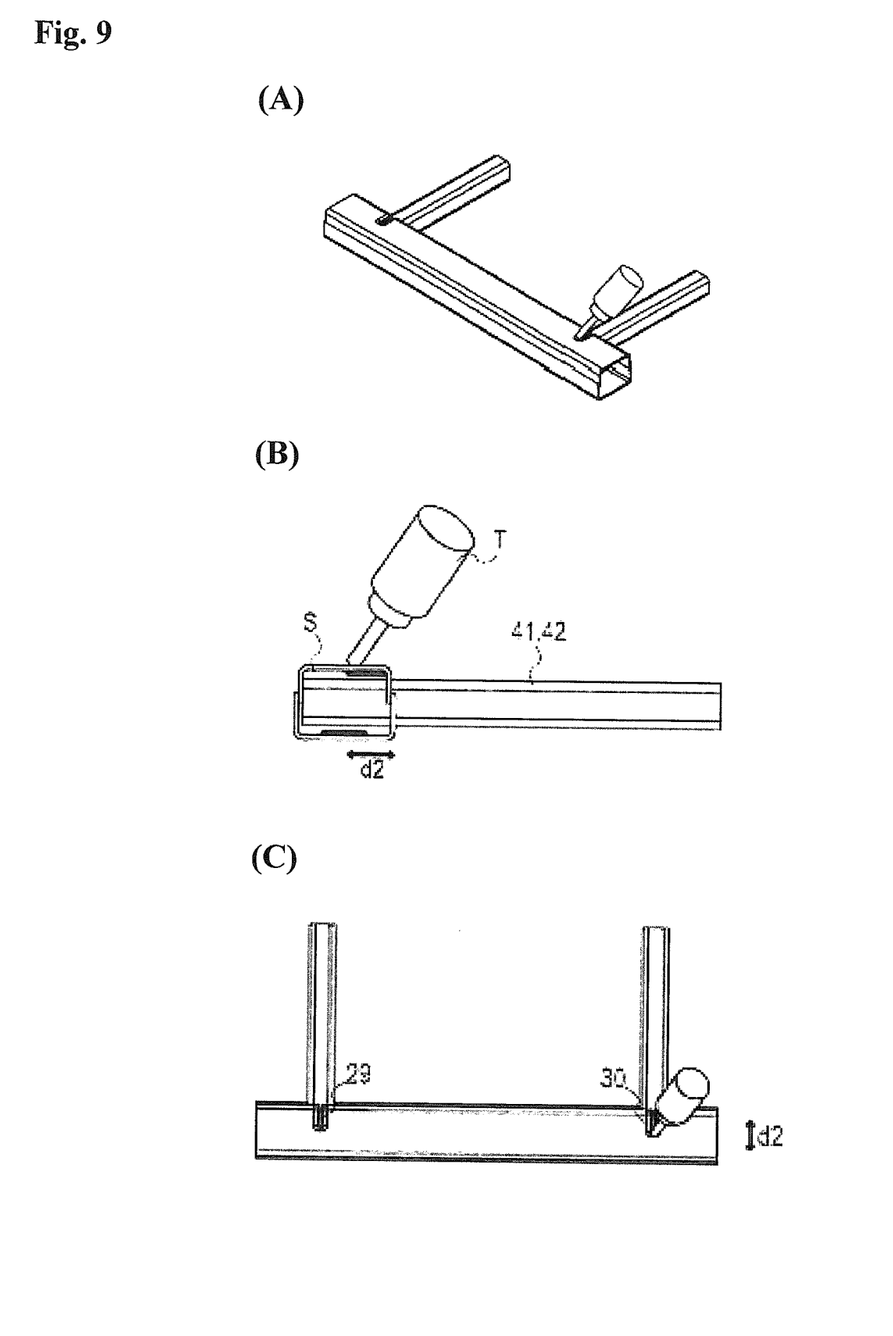
FIGS. 9A to 9C are a perspective view, a side view, and a plan view illustrating a groove joining step.

In the groove joining step, first, as illustrated in FIGS. 9A to 9C, in the same way as in the assembly step, in a state where the lower member 21 is mounted on the upper member 11, welding is performed on the groove portions 29 and 30 of the lower member 21 (step ST3). As described above, the groove portions 29 and 30 are formed in the extended manner in the longitudinal direction when mounted on the vehicle, whereby the welding is performed by moving the welding torch T in a vehicle longitudinal direction d2 along the groove portions 29 and 30. Accordingly, joining regions of the lower member 21 and the side members 41 and 42 are formed.

Next, the joined work is inverted upside down. In FIGS. 10A to 10C, the inverted work is illustrated. As illustrated in FIGS. 10A to 10C, in a state where the lower member 21 is placed underneath the upper member 11, the welding torch T is applied to the groove portions 19 and 20 of the upper member 11 to perform welding (step ST3). Accordingly, joining regions of the upper member 11 and the side members 41 and 42 are formed.

Next, in the insertion portion joining step, as illustrated in FIGS. 11A to 11C, welding is performed on the insertion portions 17, 18, 27, and 28, which are regions protruding to the outside of the side members 41 and 42 from the internal space S within the cross member 10 (step ST4). Accordingly, joining regions of the upper member 11 and the side members 41 and 42 as well as joining regions of the lower member 21 and the side members 41 and 42 are further formed. In this embodiment, among the edge portions, the welding of the insertion portions is performed on the edge portions 17a, 17b, 18a, and 18b linearly extending in the vehicle lateral direction; however, it is also possible to perform the welding on the edge portions 17c, 17d, 18c, and 18d linearly extending in the vehicle vertical direction.

Next, in the reinforcement member joining step, as illustrated in FIGS. 12A to 12C, welding is performed on joining parts j3 and j5 of the reinforcement members 51 and 52 and the side members 41 and 42 as well as on contact portions j4 and j6 of the reinforcement members 51 and 52 and the cross member 10 (step ST5). Note that the welding of the reinforcement members 51 and 52 to the side members 41 and 42 or to the cross member 10 may be in any order. The reinforcement members 51 and 52 may be welded first to the side members 41 and 42, or the reinforcement members 51 and 52 may be welded first to the cross member 10.

Next, in the coupling member mounting step, as illustrated in FIGS. 13A to 13C, the brackets 61 and 62 are welded to the side members 41 and 42 at contact portions therebetween (step ST6). Note that as described above, the brackets 71 and 72 are shipped in a state of not being fastened, with a bolt, to the brackets 61 and 62.

Next, working effects according to this embodiment are described hereinafter. In business expansion not only within Japan but also to overseas markets, there is a demand for a commodity, or a suspension member, in a low price range as well as in a high price range. However, simply reducing a plate thickness of a plate material to respond to such demand may result in forming a region with decreased rigidity, whereby it may become difficult to sufficiently resist input from the outside. There is also a problem in that strain may be easily caused to a part where the plate thickness is thin during the welding, which may affect dimensional accuracy of a product.

In contrast, in this embodiment, in the assembly step, the cross member 10 is formed by the upper member 11 and the lower member 21 and is assembled into a state where the side members 41 and 42 are inserted from the outside into the internal space S formed therein by the upper member 11 and the lower member 21. Then, in the first joining step, the upper member 11 and the lower member 21 are joined together, and in the second joining step, the side members 41 and 42 and the cross member 10 overlapping each other in the internal space S are joined together.

Thus, even though the internal space S is formed, by a very simple method of inserting the side members 41 and 42 from the outside into the internal space S and joining the side members 41 and 42 thereto, it is possible to prevent rigidity of the cross member from being decreased within the internal space S while also suppressing strain of a welded part. Since the above-described method is a very simple method in which the side members 40 are inserted into the internal space S formed within the cross member 10 and disposed thereto, it is possible to achieve a cost reduction of the suspension member 100 by decreasing a manufacturing cost thereof.

The upper member 11 has the raised portions 15 and 16 that are formed so as to protrude to an outer side of the raised portions 25 and 26 of the lower member 21. In the first joining step, joining is performed by placing the lower member 21 on the upper member 11. Thus, it is possible to prevent a decrease in quality of a region to be welded due to dropping of beads caused during the welding.

In the groove joining step of the second joining step, joining is performed in a state where the upper member 11 is disposed below the lower member 21 and the side member 40 is inserted from the outside into the internal space S. Thus, it is possible to apply the welding torch T easily to the groove portions 29 and 30, which are regions to be welded of the lower member 21 and the side member 10, whereby welding work can be performed easily.

In the second joining step, joining to the side members 40 is performed at the groove portions 19, 20, 29, and 30 provided to the upper member 11 and the lower member 21. Thus, regions to be welded can be easily grasped visually, whereby the welding work can be performed easily even in a factory not using equipment such as an expensive robot.

The groove portions 29 and 30 have shapes extending in the longitudinal direction when mounted on the vehicle, whereby it is possible to form joining regions along a direction in which the side members 40 extend, whereby it is possible to increase joining strength between the side members 40 and the cross member 10.

The side members 40 and the cross member 10 are configured to be joined in the insertion portion joining step at the insertion portions 17, 18, 27, and 28 of the cross member 10 through which the side members 40 are inserted. Thus, not only the groove portions 19, 20, 29, and 30 but also the insertion portions 17, 18, 27, and 28 serve as joining parts, whereby it is possible to further increase the joining strength between the side members 40 and the cross member 10.

The insertion portion joining step is configured to be performed after the groove portion joining step. At the insertion portions 17, 18, 27, and 28, the side members 40 and the cross member 10 are in line contact, not surface contact, with each other. Thus, welding the insertion portions 17, 18, 27, and 28 before the groove portions 19, 20, 29, and 30 may result in a wobble of the side members 40 with the insertion portions 17, 18, 27, and 28 as origins, whereby the strain due to the welding may be easily caused. In contrast, by welding the groove portions 19, 20, 29, and 30 first, it is possible to sufficiently fix the side members 40 to the cross member 10 by joining the side members 40 at multiple parts, whereby it is possible to prevent the strain due to the welding from being caused in the insertion portion joining step.

In the insertion portion joining step, the joining regions are formed to be linearly extending in a lateral direction such as the edge portions 17a, 17b, 18a, and 18b or in a vertical direction such as the edge portions 17c, 17d, 18c, and 18d when mounted on a vehicle. Thus, the welding work can be performed easily.

The present invention is not limited to the above-described embodiment and may be modified in various ways within the scope of claims.

As above, the embodiment has been described in which the reinforcement members 50 are joined to the side members 40 and the cross member 10; however, it is not to be limited to this embodiment, and it is also possible to configure the suspension member without the reinforcement members.

REFERENCE SIGNS LIST

10: Cross member
11: Upper member (first member)
12, 22: Base portion (crossing portion)
13, 14, 23, 24: Bent part
15, 16, 25, 26: Raised portion
17, 18, 27, 28: Insertion portion (another joining portion)
19, 20: Groove portion (joining portion)
29, 30: Groove portion (extending groove, joining portion)
21: Lower member (second member)
40, 41, 42: Side member
50, 51, 52: Reinforcement member
60, 61, 62: Bracket (coupling member)
70, 71, 72: Bracket (coupling member)
d1: Cross member extending direction
d2: Vehicle longitudinal direction
S: Internal space
T: Welding torch

The invention claimed is:

1. A method for manufacturing a suspension member, the suspension member including:
   a pair of side members extending in a longitudinal direction of a vehicle and being disposed on right and left sides when mounted on the vehicle; and
   a cross member configured to link the pair of side members together, the cross member including a first member and a second member, each provided with a crossing portion extending in a direction crossing a direction in which the side members extend and raised portions raised from the crossing portion,
   the method comprising:
   an assembly step in which the cross member is formed by the first member and the second member and is assembled into a state where the side members are inserted from the outside into an internal space formed by the first member and the second member;
   a first joining step in which the first member and the second member are joined together; and
   a second joining step in which the side members and the cross member overlapping each other in the internal space are joined together.

2. The method for manufacturing a suspension member according to claim 1, wherein
   the first member includes the raised portions protruding to an outer side of the raised portions of the second member, and
   in the first joining step, the second member is placed on which the first member is disposed.

3. The method for manufacturing a suspension member according to claim 1, wherein
   in the second joining step, joining is performed in a state where the first member is disposed below the second member and where the side members are inserted between the first member and the second member.

4. The method for manufacturing a suspension member according to claim 1, wherein
   a groove is formed in the first member and/or the second member, and
   the second joining step includes a groove joining step in which joining to the side members is performed at the groove of the first member and the second member.

5. The method for manufacturing a suspension member according to claim 4, wherein
   the groove is provided with an extending groove extending in a longitudinal direction when mounted on the vehicle.

6. The method for manufacturing a suspension member according to claim 1, wherein
   the second joining step includes an insertion portion joining step in which joining of the cross member and the side member is performed at insertion portions through which the side members are inserted into the internal space.

7. The method for manufacturing a suspension member according to claim 6, wherein
   the insertion portion joining step is performed after the groove joining step.

8. The method for manufacturing a suspension member according to claim 7, wherein
   in the insertion portion joining step, joining regions between the cross member and the side members linearly extend in a lateral direction or in a vertical direction when mounted on the vehicle.

9. The method for manufacturing a suspension member according to claim 6, wherein
   in the insertion portion joining step, joining regions between the cross member and the side members linearly extend in a lateral direction or in a vertical direction when mounted on the vehicle.

10. A suspension member comprising:
    a pair of side members extending in a longitudinal direction of a vehicle and being disposed on right and left sides when mounted on the vehicle; and
    a cross member configured to link the pair of side members together, the cross member including a first member and a second member, each extending in a lateral direction of the vehicle and provided with a bent part, wherein
    the first member and the second member include:
    crossing portions extending in a direction crossing a direction in which the side members extend;
    raised portions raised relative to the crossing portions;
    an internal space surrounded by the first member and the second member;
    insertion portions through which the side members are inserted from the outside into the internal space and are disposed thereto; and
    joining portions where the side members and the cross member overlapping each other in the internal space are joined together.

11. The suspension member according to claim 10, wherein
    one of the first member and the second member has the raised portions protruding to an outer side of the raised portions of the other of the first member and the second member.

12. The suspension member according to claim 10, wherein
    each of the joining portions has a groove shape.

13. The suspension member according to claim 12, wherein
    the groove shape has an extending groove extending in a longitudinal direction when mounted on the vehicle.

14. The suspension member according to claim 10, wherein
    in addition to the joining portions where the side members and the cross member are joined together in the internal space, the insertion portion includes another joining portion configured to join the side members and the cross member together through the insertion portions.

15. The suspension member according to claim 14, wherein
    the another joining portion is configured to linearly extend in the lateral direction or in the vertical direction when mounted on a vehicle.

* * * * *